United States Patent
Kim et al.

(10) Patent No.: US 12,499,675 B2
(45) Date of Patent: Dec. 16, 2025

(54) ARTIFICIAL INTELLIGENCE SYSTEM AND METHOD FOR MODIFYING IMAGE ON BASIS OF RELATIONSHIP BETWEEN OBJECTS

(71) Applicant: SAMSUNG ELECTRONICS CO., LTD., Suwon-si (KR)

(72) Inventors: Eunseo Kim, Suwon-si (KR);
Chanwon Seo, Suwon-si (KR);
Youngeun Lee, Suwon-si (KR);
Hongpyo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 385 days.

(21) Appl. No.: 18/111,401

(22) Filed: Feb. 17, 2023

(65) Prior Publication Data
US 2023/0206618 A1   Jun. 29, 2023

Related U.S. Application Data

(63) Continuation of application No. PCT/KR2021/010867, filed on Aug. 17, 2021.

(30) Foreign Application Priority Data

Aug. 18, 2020   (KR) .......... 10-2020-0103431

(51) Int. Cl.
*G06V 10/82*   (2022.01)
*G06V 10/778*   (2022.01)
*G06V 10/84*   (2022.01)

(52) U.S. Cl.
CPC .......... *G06V 10/82* (2022.01); *G06V 10/7788* (2022.01); *G06V 10/84* (2022.01)

(58) Field of Classification Search
CPC ..... G06V 10/82; G06V 10/7788; G06V 10/84
See application file for complete search history.

(56) References Cited

U.S. PATENT DOCUMENTS

| | | | |
|---|---|---|---|
| 9,154,709 B2 | 10/2015 | Cohen et al. | |
| 9,846,810 B2 | 12/2017 | Partis | |

(Continued)

FOREIGN PATENT DOCUMENTS

| | | |
|---|---|---|
| CN | 111475668 A | 7/2020 |
| JP | 2005-303908 A | 10/2005 |

(Continued)

OTHER PUBLICATIONS

Mohammed Suhail, "Graph neural network for situation recognition", 2019, The University of British Columbia (38 pages) (Year: 2019).*

(Continued)

*Primary Examiner* — David F Dunphy
(74) *Attorney, Agent, or Firm* — Sughrue Mion, PLLC

(57) ABSTRACT

An electronic device includes: a processor; and a memory storing instructions. By executing the instructions, the processor is configured to: receive a first image, recognize a plurality of objects in the first image to generate object information representing the plurality of objects, generate an object relationship graph including relationships between the plurality of objects, based on the first image and the object information, obtain image effect data including image effects to be respectively applied to the plurality of objects by inputting the object relationship graph to an image modification Graph Neural Network (GNN) model, and generate a modified image based on the first image, the object information, and the image effect data.

19 Claims, 17 Drawing Sheets

(56) References Cited

U.S. PATENT DOCUMENTS

| | | |
|---|---|---|
| 10,019,506 B1 | 7/2018 | Li et al. |
| 10,031,926 B2 | 7/2018 | Kim et al. |
| 10,425,593 B2 | 9/2019 | O'Neill |
| 10,643,130 B2 | 5/2020 | Fidler et al. |
| 11,113,532 B2 | 9/2021 | Kim et al. |
| 11,222,413 B2 | 1/2022 | Kim et al. |
| 11,636,670 B2 | 4/2023 | Kim |
| 2005/0238321 A1 | 10/2005 | Gohara et al. |
| 2006/0251292 A1 | 11/2006 | Gokturk et al. |
| 2015/0365487 A1 | 12/2015 | Mitchell et al. |
| 2016/0127653 A1 | 5/2016 | Lee et al. |
| 2020/0204727 A1* | 6/2020 | Wang ............ G06V 10/82 |
| 2021/0232863 A1 | 7/2021 | Seo et al. |

FOREIGN PATENT DOCUMENTS

| | | |
|---|---|---|
| KR | 10-2012-0021606 A | 3/2012 |
| KR | 10-2016-0051390 A | 5/2016 |
| KR | 10-2017-0062290 A | 6/2017 |
| KR | 10-2018-0051367 A | 5/2018 |
| KR | 10-2018-0055708 A | 5/2018 |
| KR | 10-2019-0094133 A | 8/2019 |
| KR | 10-2097905 B1 | 4/2020 |
| KR | 10-2021-0095527 A | 8/2021 |
| KR | 10-2359391 B1 | 2/2022 |

OTHER PUBLICATIONS

International Search Report (PCT/ISA/210) issued by the International Searching Authority on Nov. 17, 2021 in International Application No. PCT/KR2021/010867.
Communication dated Nov. 18, 2024 issued by the European Patent Office in European Patent Application No. 21858552.9.
Extended European Search Report dated Jan. 5, 2024 in European Application No. 21858552.9.
Siddhartha et al., "Learning Generative Models of 3D Structures", State of The Art Report, 2020, vol. 39, No. 2, pp. 643-666 (24 pages total).
Yunchao et al., "Learning to Describe Scenes with Programs", ICLR, 2019, pp. 1-13 (13 pages total).
Li et al., "Graph-Based Social Relation Reasoning", Springer Nature Switzerland AG, 2020, pp. 18-34 (17 pages total).
Communication issued on Feb. 14, 2025 by the Korean Intellectual Property Office for Korean Patent Application No. 10-2020-0103431.

* cited by examiner

FIG. 8

|  | Main person | Ball | Background people | Sports stadium |
|---|---|---|---|---|
| Main person | Self<br>(relation category 1) | Gaze, throw<br>(relation category #) | No connection | Action place related<br>(relation category #) |
| Ball | Gaze, throw<br>(relation category #) | Self<br>(relation category 1) | No connection | category related<br>(relation category #) |
| Background people | No connection | No connection | Self<br>(relation category 1) | category related<br>(relation category #) |
| Sports stadium | Action place related<br>(relation category #) | category related<br>(relation category #) | category related<br>(relation category #) | Self<br>(relation category 1) |

FIG. 10

|  | Location | Color distribution(R) mean | Color distribution(G) standard deviation | ... | Category (one-hot vector) |
|---|---|---|---|---|---|
| Main person | center | 124 | 10 |  | 1 |
| Ball | Left top | 111 | 34 |  | 5 |
| Background people | Left bottom | 32 | 3 |  | 8 |
| Sports stadium | background | 42 | 5 |  | 5 |

FIG. 11

|  | Main person | Ball | Background people | Sports stadium |
|---|---|---|---|---|
| Main person | Self<br>(weight 1) | Gaze, throw<br>(weight 0.9) | No connection<br>(weight 0) | Action place related<br>(weight 0.2) |
| Ball | Gaze, throw<br>(weight 0.9) | Self<br>(weight 1) | No connection<br>(weight 0) | category related<br>(weight 0.2) |
| Background people | No connection<br>(weight 0) | No connection<br>(weight 0) | Self<br>(weight 1) | category related<br>(weight 0.2) |
| Sports stadium | Action place related<br>(weight 0.2) | category related<br>(weight 0.2) | category related<br>(weight 0.2) | Self<br>(weight 1) |

Normalized weight (0~1)

Weight 0: Not related, No interaction
Weight 0.4: push
Weight 0.6: throw
Weight 0.8: eat
Weight 0.9: gaze + grab
Weight 1.0: self

FIG. 12

|  | Adjust Saturation | Adjust Lightness | ... | Enlarge eyes |
|---|---|---|---|---|
| Main person | +0.0(scale value) | +0.7(scale value) |  | 0.0 |
| Ball | +0.8(scale value) | +0.7(scale value) |  | (Not related) |
| Background people | −0.0(scale value) | −0.5(scale value) |  | (Not related) |
| Sports stadium | +0.0(scale value) | +0.1(scale value) |  | (Not related) |

ARTIFICIAL INTELLIGENCE SYSTEM AND METHOD FOR MODIFYING IMAGE ON BASIS OF RELATIONSHIP BETWEEN OBJECTS

CROSS-REFERENCE TO RELATED APPLICATIONS

This application is a by-pass continuation application of International Application No. PCT/KR2021/010867, filed on Aug. 17, 2021, which based on and claims priority to Korean Patent Application No. 10-2020-0103431, filed on Aug. 18, 2020, in the Korean Intellectual Property Office, the disclosures of which are incorporated by reference herein in their entireties.

BACKGROUND

1. Field

The present disclosure relates to an artificial intelligence system and method for modifying an image on the basis of a relationship between objects.

2. Description of Related Art

Recently, as digital cameras and smartphones have become widespread, users are taking many pictures, and accordingly, demand for a technology for editing the pictures has increased. In particular, a technology has been developed, in which a device automatically edits or suggests editing without the need for a user to manually set and edit parameters. Users tend to set (or predetermine) editing types and parameters according to the type of subject, such as making a person's body slimmer, increasing the brightness of a person's face, and increasing the saturation of food.

Unlike rule-based (e.g., script-based) systems in the related art, an Artificial Intelligence (AI) system is a system in which a machine (e.g., a computer) learns, judges, and becomes smarter by itself. The more the artificial intelligence system is used or trained, the better the recognition rate and the more accurate the understanding of user preferences, and thus, the rule-based systems in the related art are replaced by AI systems, for example, deep learning based systems.

AI technology includes machine learning (deep learning) and element technologies using machine learning. Machine learning classifies/learns features of input data by itself, and element technology uses machine learning algorithms such as deep learning, and includes language understanding, visual understanding, reasoning/prediction, knowledge expression, motion control.

SUMMARY

According to an embodiment of the present disclosure, an artificial intelligence system and method for modifying an image on the basis of a relationship between objects are provided, so that a modified image, in which an image effect suitable for an image is applied, may be generated.

According to an aspect of the present disclosure, an electronic device includes: a processor; and a memory storing instructions. By executing the instructions, the processor is configured to: receive a first image, recognize a plurality of objects in the first image to generate object information representing the plurality of objects, generate an object relationship graph including relationships between the plurality of objects, based on the first image and the object information, obtain image effect data including image effects to be respectively applied to the plurality of objects by inputting the object relationship graph to an image modification Graph Neural Network (GNN) model, and generate a modified image based on the first image, the object information, and the image effect data.

According to another aspect of the present disclosure, an electronic device includes: a processor; and a memory storing instructions. By executing the instructions, the processor is configured to: receive a first image and a modified image that is a modified version of the first image to which an image effect is applied, recognize a plurality of objects in the first image to generate object information representing the plurality of objects, generate an object relationship graph indicating relationships between the plurality of objects, based on the first image and the object information, generate, based on the first image, the object information, and the modified image, image effect data including image effects respectively applied to the plurality of objects in the modified image, and train, based on the object relationship graph and the image effect data, an image modification GNN model including the object relationship graph as an input and the image effect data as an output.

According to another aspect of the present disclosure, a method performed by an electronic device, includes: receiving a first image; recognizing a first plurality of objects in the first image to generate first object information representing the first plurality of objects; generating a first object relationship graph indicating first relationships between the first plurality of objects, based on the first image and the first object information; obtaining first image effect data including first image effects to be respectively applied to the first plurality of objects by inputting the first object relationship graph to an image modification GNN model; and generating a modified image based on the first image, the first object information, and the first image effect data.

The method further includes: receiving the modified image; recognizing a second plurality of objects in the first image to generate second object information representing the second plurality of objects; generating a second object relationship graph indicating second relationships between the second plurality of objects, based on the first image and the second object information; generating, based on the first image, the second object information, and the modified image, second image effect data including second image effects respectively applied to the second plurality of objects in the modified image; and training, based on the second object relationship graph and the second image effect data, the image modification GNN model.

According to an embodiment of the present disclosure, an artificial intelligence system and method for modifying an image on the basis of a relationship between objects are provided, so that a modified image, in which an image effect suitable for an image is applied, may be generated.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 illustrates an adjacent matrix of an object relationship graph according to an embodiment of the present disclosure;

FIG. 10 illustrates a node feature matrix of an object relationship graph according to an embodiment of the present disclosure;

FIG. 11 illustrates an adjacent matrix of an object relationship graph having edge weights, according to an embodiment of the present disclosure;

FIG. 12 illustrates image effect data according to an embodiment of the present disclosure;

DETAILED DESCRIPTION

Figure 1:
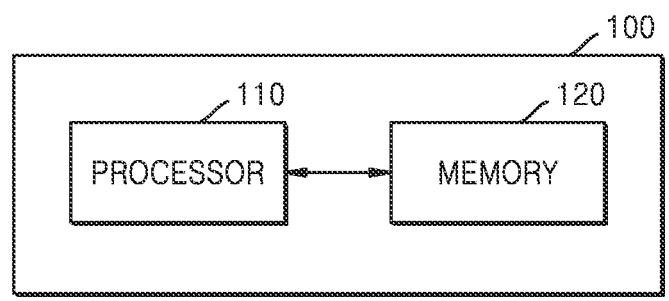
FIG. 1 illustrates a structure of an image modification system based on relationships between a plurality of objects, according to an embodiment of the present disclosure.

An embodiment of the present disclosure will be described in detail with reference to the accompanying drawings in order to clarify the technical spirit of the present disclosure. In the description of the present disclosure, certain detailed explanations of functions or components of the related art are omitted when it is deemed that they may unnecessarily obscure the essence of the present disclosure. Elements having substantially the same functional configuration in the drawings are given the same reference numbers and reference numerals as much as possible even though they are shown in different drawings. For convenience of explanation, when necessary, the device and method will be described together. Each operation of the present disclosure does not necessarily have to be performed in the order described, and may be performed in parallel, selectively, or individually.

FIG. 1 illustrates a structure of an image modification system based on a relationship between objects, according to an embodiment of the present disclosure. In FIG. 1, an image modification system (or an electronic device) 100 according to an embodiment of the present disclosure may include a processor 110 and a memory 120 storing one or more instructions that are executable by the processor 110. An operation of the image modification system 100, performed by the processor 110 executing one or more instructions stored in the memory 120, is described below in detail with reference to FIGS. 3 to 13. Hereinafter, the image modification system 100 may mean an electronic device including the processor 110 and the memory 120.

Figure 2:
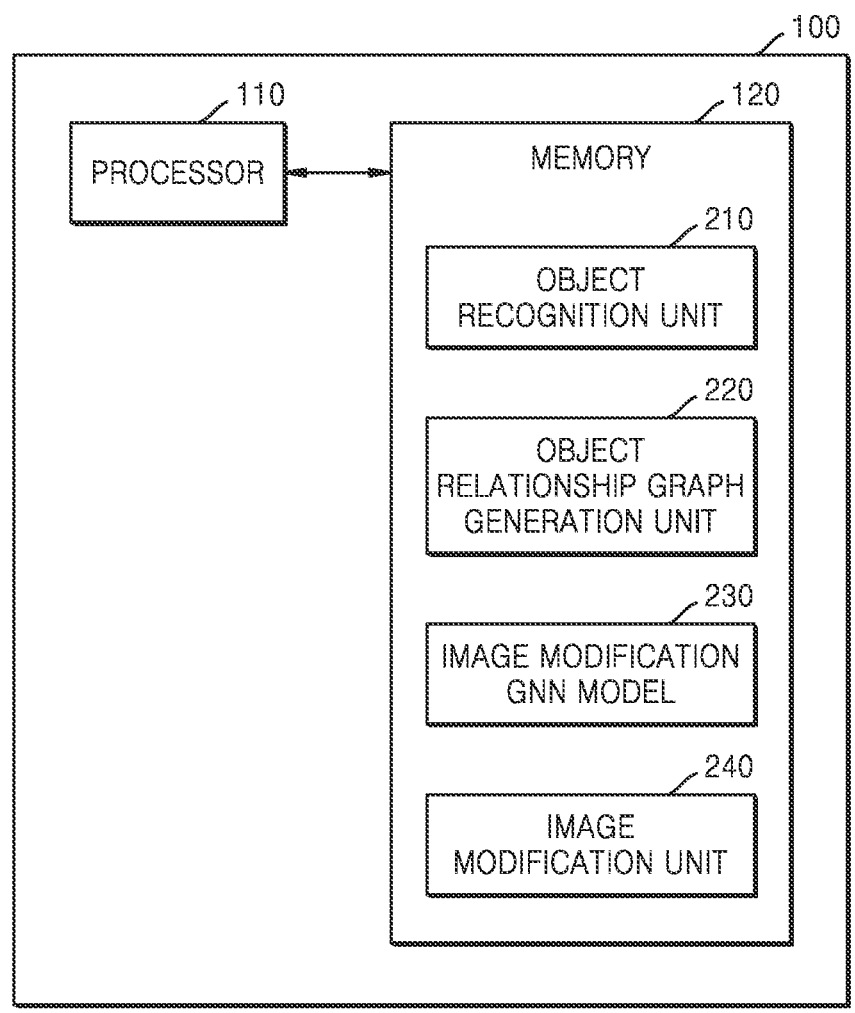
FIG. 2 illustrates a structure of an image modification system according to an embodiment of the present disclosure.

FIG. 2 illustrates a structure of an image modification system according to an embodiment of the present disclosure. In FIG. 2, an object recognition unit 210, an object relationship graph generation unit 220, an image modification Graph Neural Network (GNN) model 230, and an image modification unit 240 may be stored in the memory 120, and the processor 110 may read them from the memory 120 to perform a method according to an embodiment of the present disclosure.

Figure 3:
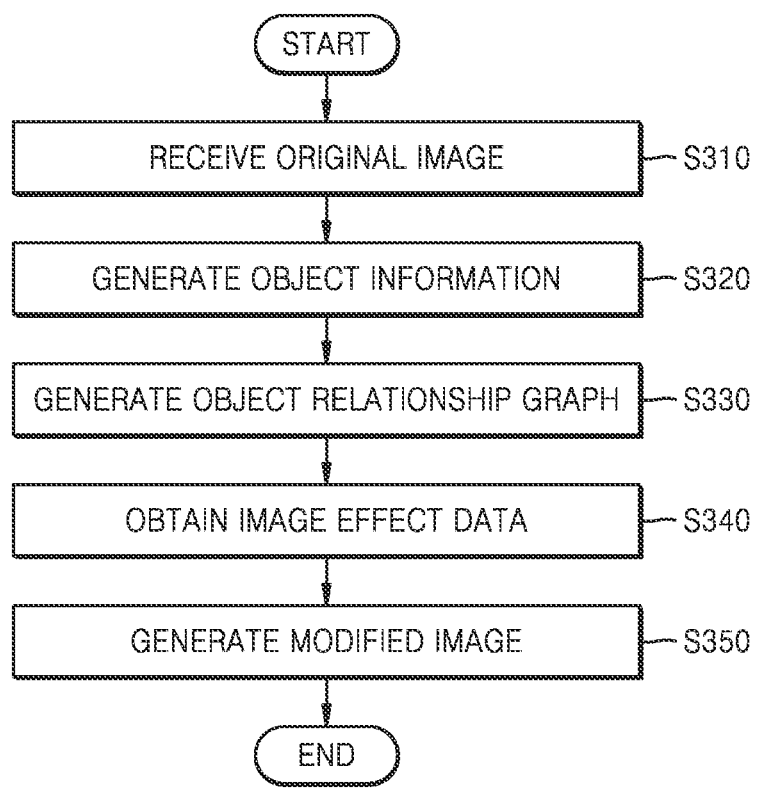
FIG. 3 illustrates an operating method of an image modification system, according to an embodiment of the present disclosure.
Figure 4:
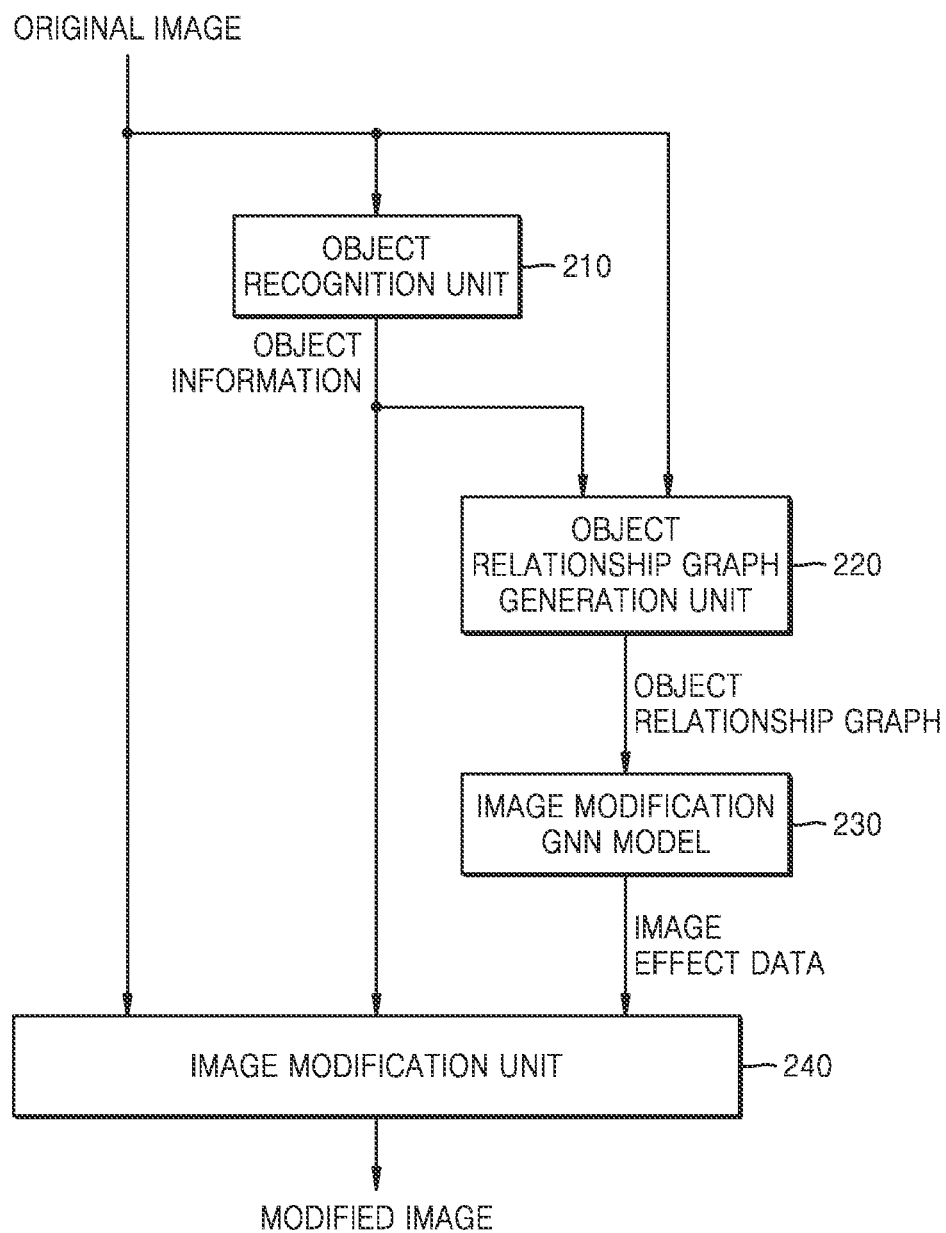
FIG. 4 illustrates a data flow during an operation of an image modification system, according to an embodiment of the present disclosure.

FIG. 3 illustrates a schematic flowchart of an operating method of an image modification system, according to an embodiment of the present disclosure, and FIG. 4 illustrates a data flow during operation of the image modification system, according to an embodiment of the present disclosure.

In FIGS. 3 and 4, the processor 110 of the image modification system (or the electronic device) 100 may receive an original image or any image in operation S310, and recognize a plurality of objects in the original image and generate object information representing the recognized plurality of objects in operation S320. The plurality of objects may include a person, an animal, a thing, a background, etc. included in an original image or in any image. For example, like a person and a hand, a hand and a finger, a car and a wheel, one object may be included in another object. Hereinafter, an original image may mean any image acquired or received by the image modification system or by an electronic device.

Figure 5:
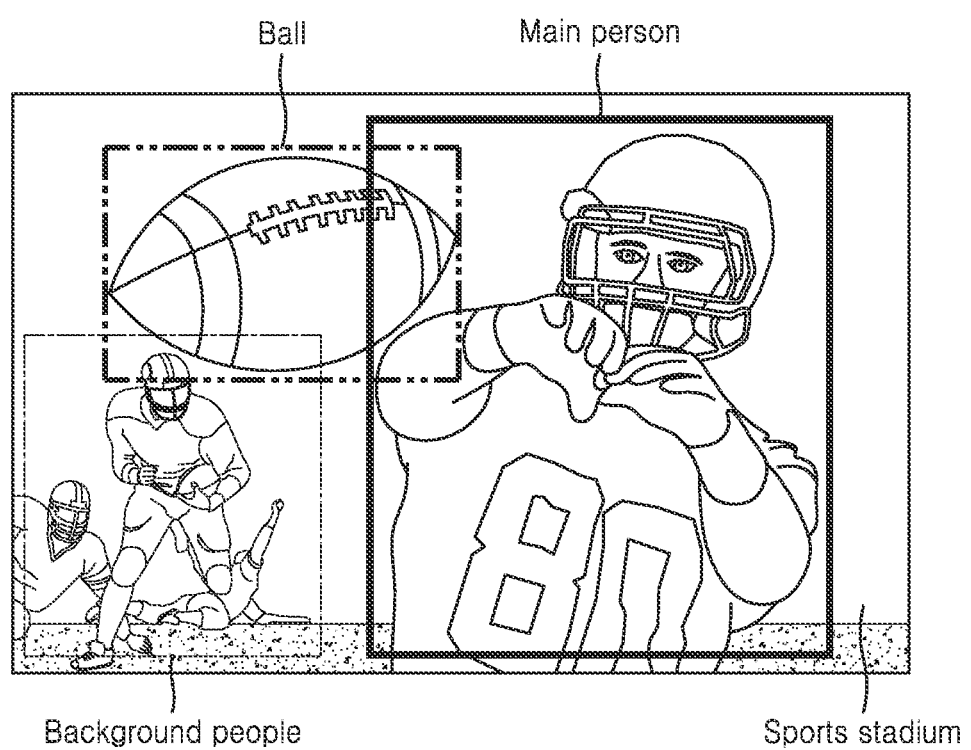
FIG. 5 illustrates objects recognized in an original image, according to an embodiment of the present disclosure.

FIG. 5 illustrates objects recognized in an original image, according to an embodiment of the present disclosure. In FIG. 5, in an original image which is a captured image of an American football game, objects such as a main person, a ball, background people, and a sports stadium are recognized.

An operation of recognizing a plurality of objects in an original image may be performed by the object recognition unit 210. The object recognition unit 210 may use a neural network model for recognizing an object in an image. The object recognition unit 210 may use a multi-AI recognition model such as object detection, scene recognition, and food type classification.

In FIGS. 3 and 4, the processor 110 may generate an object relationship graph indicating relationships between a plurality of objects, based on the original image and the object information, in operation S330. The relationships between the plurality of objects may include interactions between objects, and in particular, interactions between at least one person and at least one object, such as looking, eating, catching, throwing, pushing, wearing, riding, etc. The relationships between the plurality of objects may include 'not relevant'. The relationships between the plurality of objects, included in an object relationship graph, may include a relationship between a main person of an original image with another object.

Figure 6:
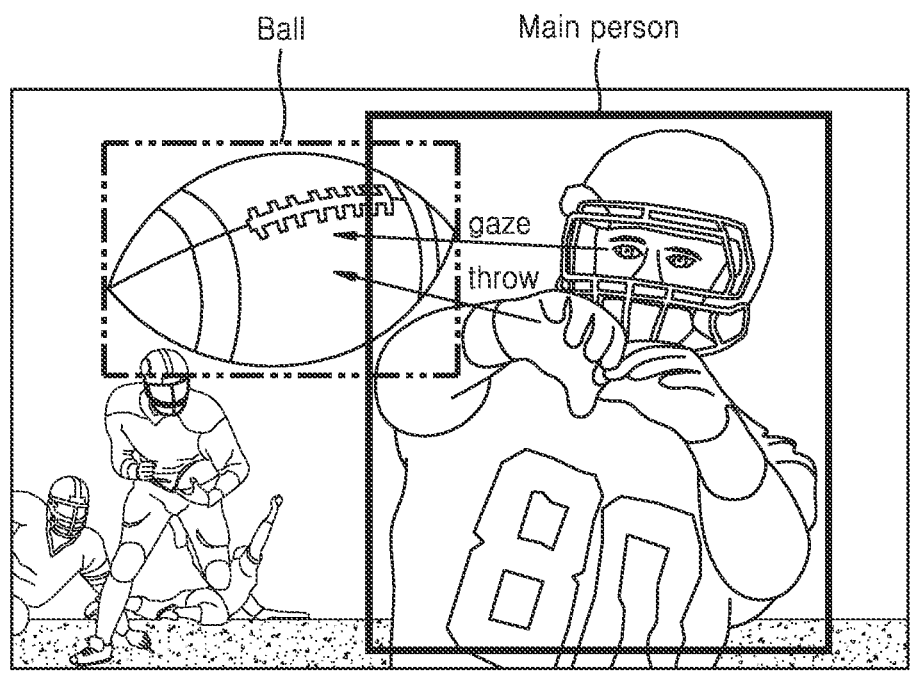
FIG. 6 illustrates a relationship between objects recognized in an original image, according to an embodiment of the present disclosure.

FIG. 6 illustrates relationships between a plurality of objects recognized in an original image, according to an embodiment of the present disclosure. In FIG. 6, a gaze and a throw, which are relationships between a main person and a ball, are recognized in the original image of FIG. 5.

Figure 7:
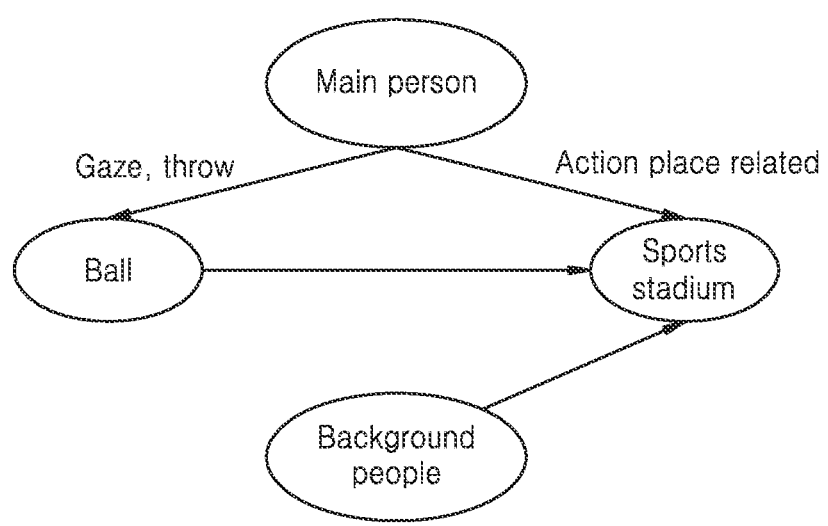
FIG. 7 illustrates an object relationship graph according to an embodiment of the present disclosure.

FIG. 7 illustrates an object relationship graph according to an embodiment of the present disclosure. In the graph of FIG. 7, each of the plurality of objects recognized in FIG. 5 may be a node, and each of the relationships between the plurality of objects recognized in FIG. 6, may be an edge. In other words, in the object relationship graph according to an embodiment of the present disclosure, each of the plurality of objects recognized in the original image may be a node, and each of the relationships between the plurality of objects may be an edge.

FIG. 8 is a diagram illustrating an adjacent matrix of an object relationship graph according to an embodiment of the present disclosure. In FIG. 8, the object relationship graph shown in FIG. 7 is expressed as an adjacent matrix. As illustrated in FIGS. 6 to 8, one edge may correspond to a plurality of relationships.

The operation of generating an object relationship graph may be performed by the object relationship graph generation unit 220. The object relationship graph generation unit 220 may use a neural network model for generating an object relationship graph.

The processor 110 may recognize not only objects in an original image, but also features of the plurality of objects. That is, the object information may include features of each of a plurality of objects. The features of an object may include a location of the object in an image, a size of the object, a color of the object, a type (category) of the object, a behavior of a person/animal, a type of a place, a region, and the like. The features of objects may be different for each type of object. For example, the features of a person may include a person's gender, age, behavior, etc., and the features of a dog may include a breed, size (large dog, medium-sized dog, small dog, etc.) hair color, behavior, etc. of the dog, and the features of food may include the region, country, material, cooking method (baking, steaming, frying, etc.) of the food. That is, the processor 110 may recognize features of each type of objects in an original image. An operation of recognizing the features of objects in an original image may be performed by the object recognition unit 210.

Figure 9:
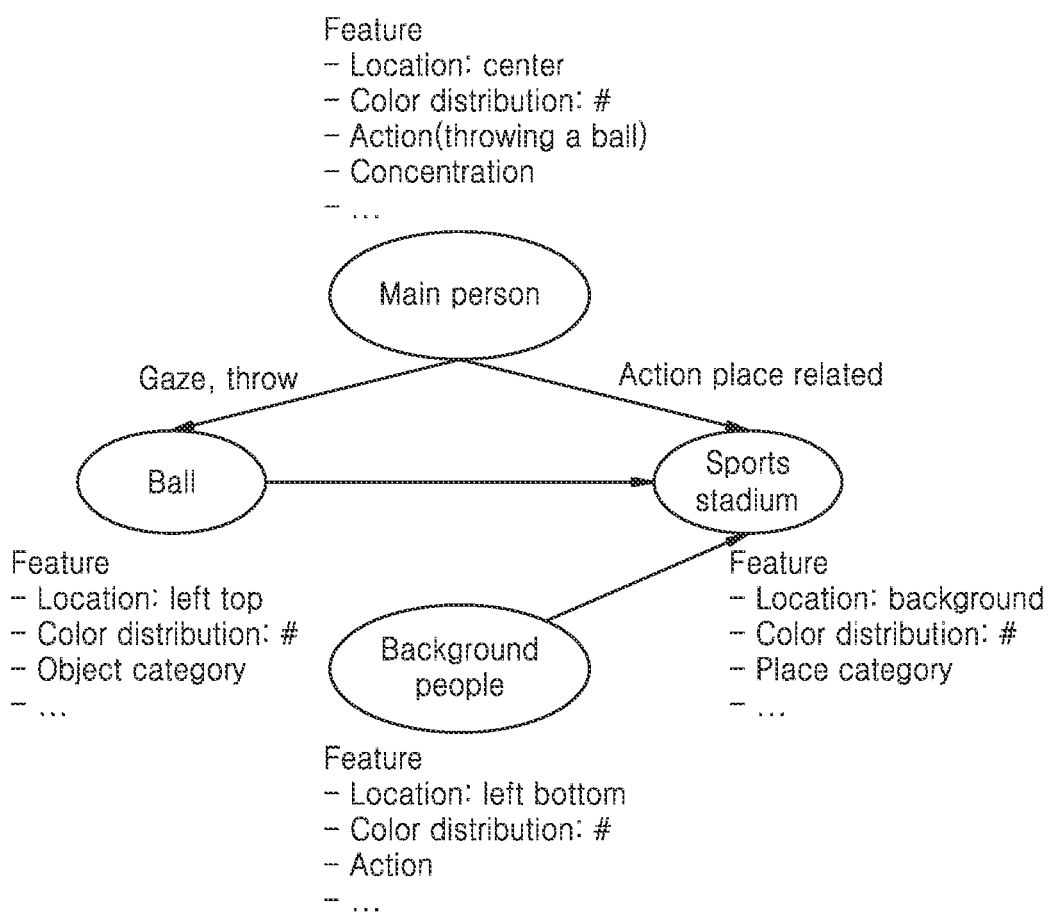
FIG. 9 illustrates an object relationship graph according to an embodiment of the present disclosure.

An object relationship graph may include features of each of the plurality of objects. FIG. 9 illustrates an object relationship graph according to an embodiment of the present disclosure. In FIG. 9, in the graph as shown in FIG. 7, features of a corresponding object are added as node features to each node. That is, in the object relationship graph according to an embodiment of the present disclosure, each of the features of each of a plurality of objects may be a node feature.

FIG. 10 illustrates a node feature matrix of an object relationship graph according to an embodiment of the present disclosure. In FIG. 10, node features of the object relationship graph shown in FIG. 7 are represented by a node feature matrix. That is, the object relationship graph shown in FIG. 7 may be represented by the adjacent matrix shown in FIG. 8 and the node feature matrix shown in FIG. 10.

Each edge of the object relationship graph may have a weight according to a type of a relationship between the objects. FIG. 11 illustrates an adjacent matrix of an object relationship graph having edge weights, according to an embodiment of the present disclosure. When one edge corresponds to a plurality of relationships, an average of weights according to the plurality of relationships may be used as a weight of the edge. In one embodiment, the weights may be preset based on knowledge.

The processor 110 may generate an object relationship graph based on metadata about an original image. The metadata may include, for example, location information and date information of an image, and information about an application used. The metadata may include information automatically generated when a picture is taken, such as Exchangeable Image File Format (EXIF) information. The processor 110 may determine a node or an edge based on the metadata. For example, the processor 110 may determine a region (e.g., Finland) or a place (e.g., a sports field) of an image as a node from location information of a picture.

In FIGS. 3 and 4, the processor 110 may obtain 'image effect data' including image effects to be respectively applied to a plurality of objects, by inputting the object relationship graph to the image modification GNN model 230 in operation S340. The image effect may include Adjust Saturation, Adjust Lightness, Adjust Color, Sharpen, Blur, Enlarge eyes, and the like. Each image effect may contain a change value. In one embodiment, the change value may include 0. In another embodiment, the change value may include 'not relevant'.

FIG. 12 illustrates image effect data according to an embodiment of the present disclosure. In FIG. 12, a table is shown in which each of the plurality of objects recognized in FIG. 5 is a row, and each of image effects to be applied to the plurality of objects is a column. That is, the image effect data according to an embodiment of the present disclosure may include a table in which each of a plurality of objects recognized in an original image is a row and each of image effects to be applied to the plurality of objects is a column.

The image modification GNN model 230 is an AI neural network model that has the object relationship graph as an input and the image effect data as an output, and may determine, based on the object relationship graph of the original image, image effects suitable to be applied to the original image, per each object. A method of training the image modification GNN model 230 will be described in detail later with reference to FIGS. 14 to 17. In one embodiment, the image modification GNN model 230 may include a Graph Convolutional Network (GCN).

In FIGS. 3 and 4, the processor 110 may generate a modified image based on the original image, object information, and image effect data in operation S350. Here, the modified image is a modified version of the original image, in which an image effect corresponding to each object is applied. That is, the processor 110 may generate, with respect to the original image, a modified image by applying an image effect (determined by the image modification GNN model 230) to each of a plurality of recognized objects.

The operation of generating the modified image may be performed by the image modification unit 240. The image modification unit 240 may use a neural network model such as Generative Adversarial Networks (GAN) to apply an image effect to an original image.

The image modification system 100 according to an embodiment of the present disclosure may provide, with respect to an original image including a plurality of objects, a modified image, in which an image effect suitable for each object is applied. In particular, the image modification system 100 may provide a modified image, in which a suitable image effect is applied according to the features of each object, according to the type of each object, or according to the features of each type of each object. For example, with respect to an original image of a person eating food in a restaurant, the image modification system 100 may provide a modified image in which an effect of increasing brightness on a person's face, an effect of increasing saturation on food, and an effect of increasing sharpness on warm food among the food are applied.

In addition, by not only using the features of each object, but also using a relationship between the plurality of objects, the image modification system 100 may provide a modified image, in which most suitable image effects for the entire image are applied. For example, in an original image, when various foods are placed in front of a person and the person is eating one of them, a modified image, in which an effect of increasing the saturation is applied only to the food that the person is eating among the various foods, may be obtained.

The processor 110 may display the modified image, in which the image effect is applied, receive a user input for the modified image, and update the image modification GNN model 230 based on the user input.

Figure 13:
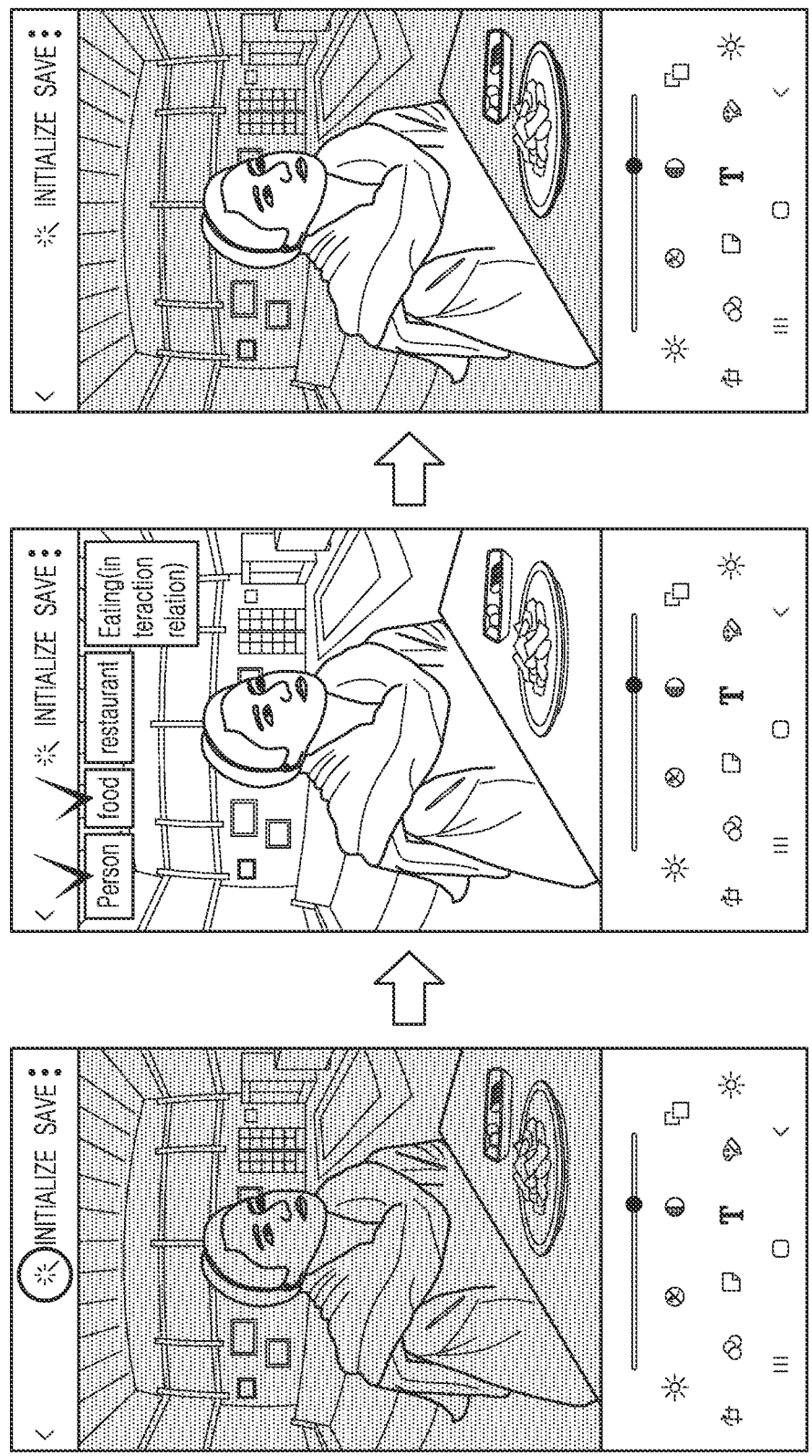
FIG. 13 illustrates an operation of a user interface according to an embodiment of the present disclosure.

FIG. 13 illustrates an operation of a user interface according to an embodiment of the present disclosure. In FIG. 13, the processor 110 may display objects recognized in an original image and relationships between the plurality of objects, and allow a user to select a desired object and a desired relationship to be applied to image modification. That is, the processor 110 may display objects to an image effect applied to the modified image, and at least one relationship, receive a user selection input for the displayed objects and the at least one relationship, and generate a final modified image, in which an image effect corresponding to the at least one object and the relationship, for which the selection input is received. The processor 110 may update the image modification GNN model 230 based on the above user selection input.

Figure 14:
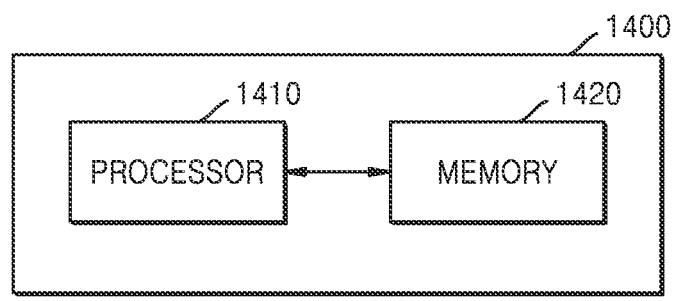
FIG. 14 illustrates a structure of an image modification model training system (an electronic device) based on a relationship between objects, according to an embodiment of the present disclosure.

FIG. 14 is a schematic view illustrating a structure of an image modification model training system (e.g., an electronic device) based on relationships between the plurality of objects, according to an embodiment of the present disclosure. In FIG. 14, an image modification model training system 1400 according to an embodiment of the present disclosure may include a processor 1410 and a memory 1420 storing one or more instructions that are executable by the processor 1410. The operation of the image modification model training system 1400 performed by the processor 1410 by executing one or more instructions stored in the memory 1420 will be described in detail below with reference to FIGS. 16 and 17, and repeated descriptions provided previously with respect to the image modification system 100 will be omitted as much as possible.

Figure 15:
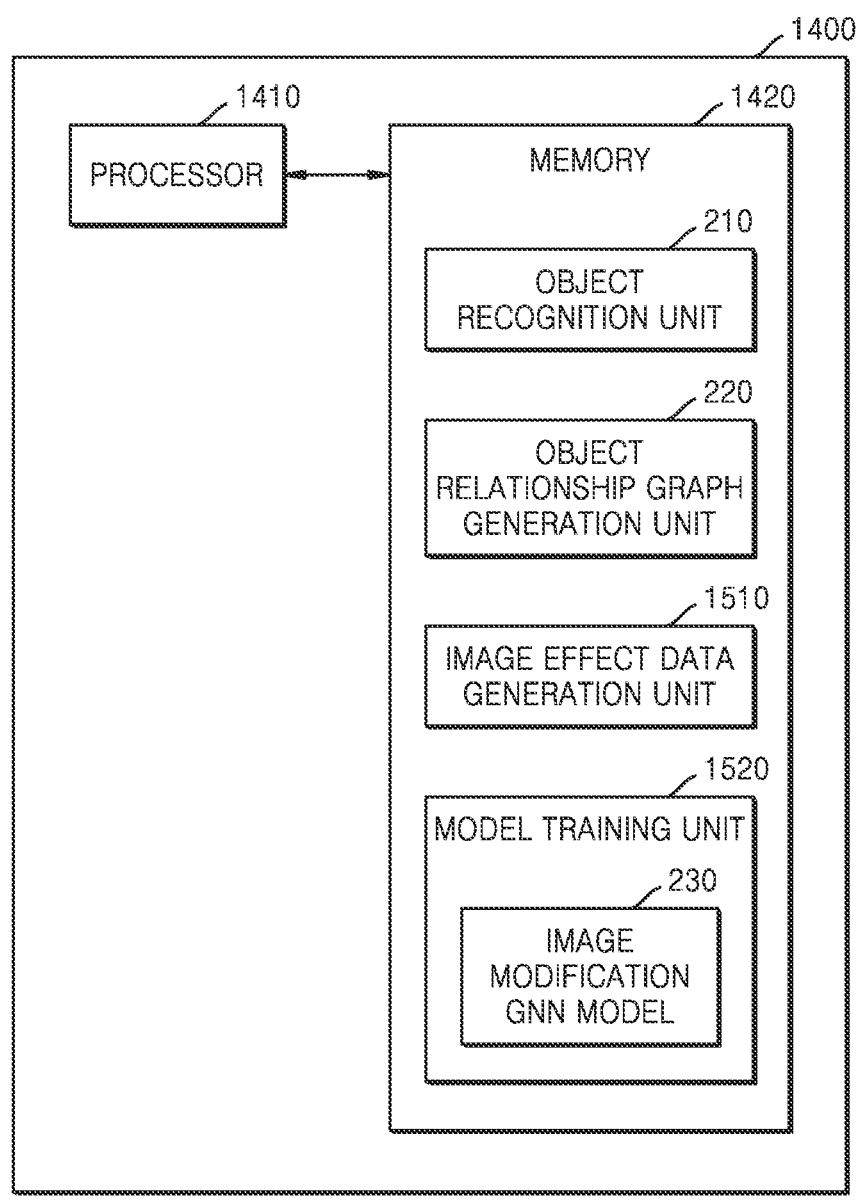
FIG. 15 illustrates a structure of an image modification model training system according to an embodiment of the present disclosure.

FIG. 15 is a detailed view of a structure of an image modification model training system according to an embodiment of the present disclosure. In FIG. 15, the object recognition unit 210, the object relationship graph generation unit 220, an image effect data generation unit 1510, and a model training unit 1520 may be stored in the memory 1420, and the processor 1410 perform the method according to an embodiment of the present disclosure, by reading these from the memory 1420. The model training unit 1520 may include the image modification GNN model 230.

Figure 16:
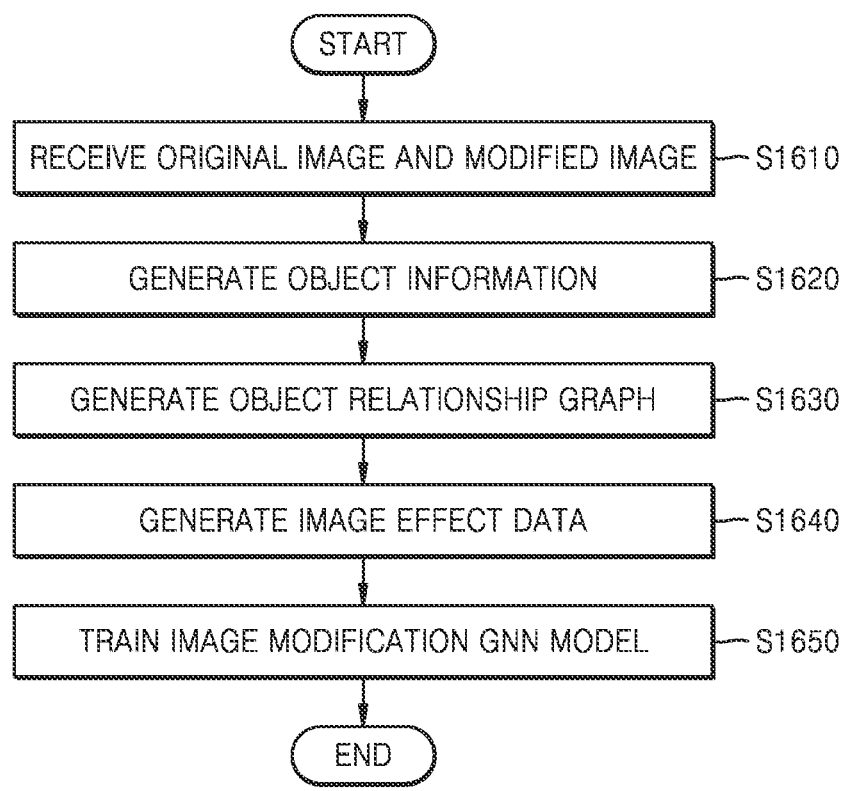
FIG. 16 illustrates a schematic flowchart of a flow of an operating method of an image modification model training system, according to an embodiment of the present disclosure.
Figure 17:
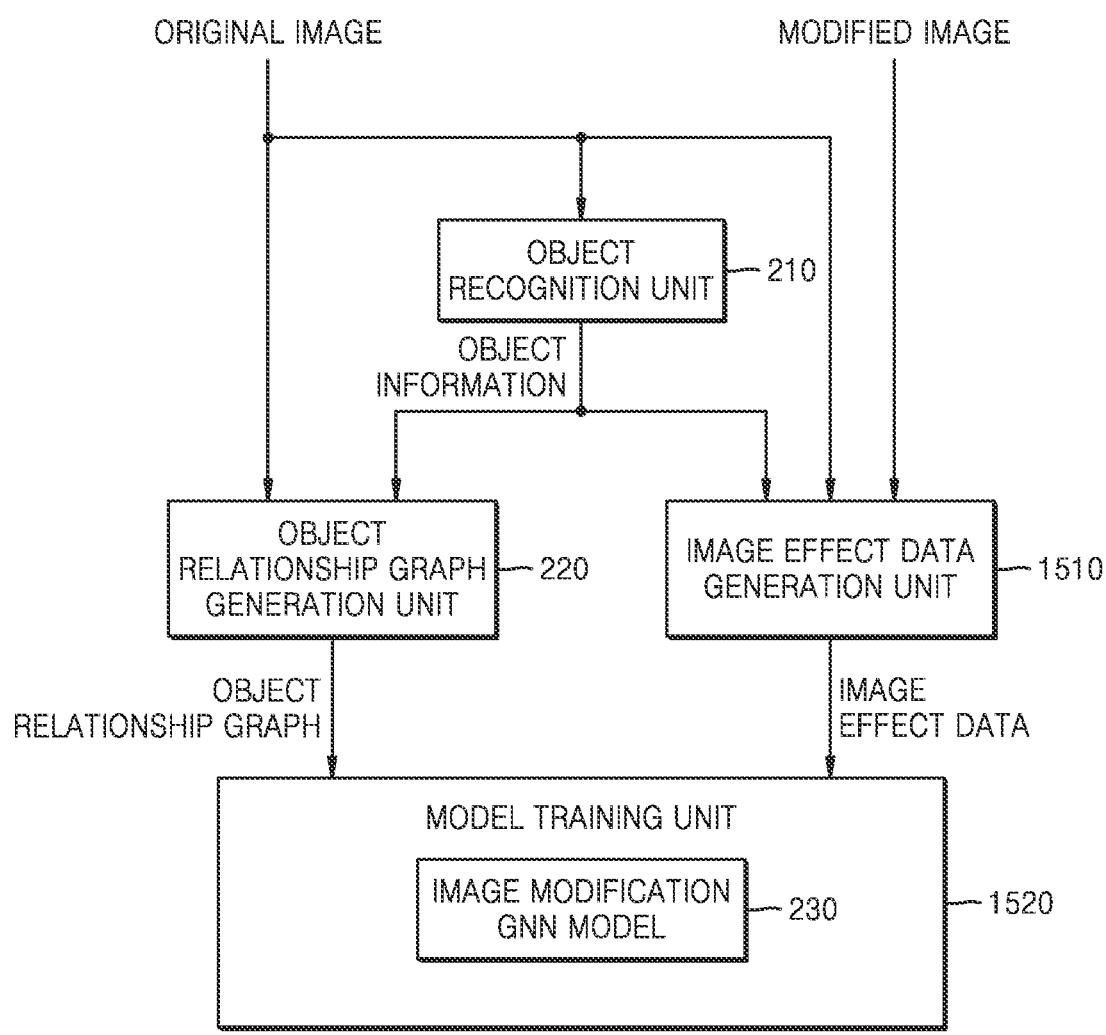
FIG. 17 illustrates a data flow during an operation of an image modification model training system, according to an embodiment of the present disclosure.

FIG. 16 is a schematic flowchart of a flow of an operating method of an image modification model training system, according to an embodiment of the present disclosure, and FIG. 17 is a diagram illustrating a data flow during operation of the image modification model training system according to an embodiment of the present disclosure. In FIGS. 16 and 17, the processor 1410 of the image modification model training system 1400 may receive an original image (e.g., any image, a first image) and a modified image (e.g., a modified version of the original image, a second image) in operation S1610. In one embodiment, the modified image corresponds to a modified version of the original image, to which an image effect is applied. Here, different image effects may be applied to respective objects.

In operation S1620, the processor 1410 may recognize a plurality of objects in the original image to generate object information representing the recognized plurality of objects.

In operation S1630, the processor 1410 may generate an object relationship graph indicating relationships between the plurality of objects based on the original image and the object information.

In operation S1640, the processor 1410 may generate 'image effect data' including image effects respectively applied to the plurality of objects in the modified image, based on the original image, the object information, and the modified image. The image effect data includes image effects respectively applied to the plurality of objects in the modified image, as described above with respect to the image modification system 100. The image effect data may be generated by the image effect data generation unit 1510.

In operation S1650, the processor 1410 may train the image modification GNN model 230 based on the object relationship graph and the image effect data. Training of the image modification GNN model 230 may be performed by the model training unit 1520. When the image modification GNN model 230 is trained, and when a change value of the image effect data is 'not relevant', a learning loss may not be applied to the corresponding object and image effect.

The object relationship graph generation unit 220 may include a neural network model for generating the object relationship graph, and the processor 1410 may receive an object relationship graph corresponding to the original image and train the neural network model for generating the object relationship graph.

The image modification model training system 1400 according to an embodiment of the present disclosure may train, based on a data set including various original images and modified images, the image modification GNN model 230 such that an image effect suitable for each object according to a relationship between objects of an original image is determined.

An embodiment of the present disclosure may also be implemented in the form of a recording medium including instructions executable by a computer, such as a program module executed by a computer. Computer-readable media can be any available media that can be accessed by a computer and includes both volatile and nonvolatile media, removable and non-removable media. Also, computer-readable media may include computer storage media and communication media. The computer storage media includes both volatile and nonvolatile, removable and non-removable media implemented in any method or technology for storage of information such as computer readable instructions, data structures, program modules or other data. The communication media may typically include other data of a modulated data signal, such as computer readable instructions, data structures, or program modules.

Also, the computer-readable storage media may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the term the 'non-transitory storage medium' may include a buffer that temporarily stores data.

In an embodiment of the disclosure, the aforementioned method according to the various embodiments of the disclosure may be provided in a computer program product. The computer program product may be a commercial product that may be traded between a seller and a buyer. The computer program product may be distributed in the form of a machine-readable storage medium (e.g., a Compact Disc Read Only Memory (CD-ROM)), through an application store (e.g., Play Storer™), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

In the specification, the term "module" may refer to a hardware component such as a processor or a circuit, and/or a software component executed by the hardware component such as the processor.

Also, in the present specification, the expression "including at least one of a, b, or c" may denote including only a, including only b, including only c, including a and b, including b and c, including a and c, and including all of a, b, and c.

Functions related to artificial intelligence, according to the present disclosure, are operated via a processor and a memory. The processor may include one or more processors. The one or more processors may include a universal processor such as a Central Processing Unit (CPU), an Application Processor (AP), a Digital Signal Processor (DSP), etc., a dedicated graphic processor such as a Graphics Processing (GP) unit, a Vision Processing Unit (VPU), etc., or a dedicated AI processor such as a Neural Processing Unit (NPU). The one or more processors control to process input data according to a predefined operation rule or artificial intelligence model, stored in the memory. When the one or more processors are the dedicated AI processors, they may be designed in a hardware structure that is specific to dealing with a particular AI model.

The predefined operation rule or the artificial intelligence model is made by training. Specifically, the predefined operation rule or the AI model being made by training refers to the predefined operation rule or the AI model established to perform a desired feature (or a purpose) as a basic artificial intelligence model is trained using a plurality of pieces of training data according to a learning algorithm. Such training may be performed by a device itself in which artificial intelligence is performed according to the disclosure, or by a separate server and/or system. Examples of the learning algorithm may include supervised learning, unsupervised learning, semi-supervised learning, or reinforcement learning, without being limited thereto.

The artificial intelligence model may be composed of a plurality of neural network layers. Each of the plurality of neural network layers has a plurality of weight values, and a neural network operation is performed through an operation between an operation result of a previous layer and a plurality of weights. The plurality of weights of the plurality of neural network layers may be optimized by a learning result of the artificial intelligence model. For example, a plurality of weights may be updated so that a loss value or a cost value obtained from the artificial intelligence model during a learning process is reduced or minimized. The artificial neural network may include a deep neural network (DNN), for example, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), or a Deep Q-Networks, but is not limited to the above-described examples.

The present disclosure has been described with reference to the embodiments thereof illustrated in the drawings. The embodiments are not intended to limit the present disclosure, and are merely exemplary, and should be considered in a descriptive sense only and not for purposes of limitation. It will be understood by one of ordinary skill in the art that the embodiments of the present disclosure may be easily modified in other specific forms all without changing the technical spirit or the essential features of the present disclosure. For example, each component described as a single type may be implemented in a distributed manner, and similarly, components described as distributed may be implemented in a combined form. Although specific terms are used in this specification, they are used only for the purpose of describing the concept of the present disclosure, and are not used to limit the meaning or scope of the present disclosure as set forth in the claims.

The technical scope of the present disclosure should be determined by the technical spirit of the appended claims rather than the above description, and it should be understood by those of ordinary skill in the art that the claims and all modifications or modified forms drawn from the concept and scope of the claims and equivalents are included in the scope of the disclosure. It should be understood that equivalents include both currently known equivalents as well as equivalents developed in the future, that is, all elements disclosed that perform the same function, regardless of the structure.

What is claimed is:

1. An electronic device comprising:
a processor; and
a memory storing instructions,
wherein, by executing the instructions, the processor is configured to:
receive a first image,
recognize a plurality of objects in the first image and generate object information representing the plurality of objects,
generate an object relationship graph comprising relationships between the plurality of objects, based on the first image and the object information,
output, by an image modification Graph Neural Network (GNN) model, image effect data comprising image effects to be respectively applied to the plurality of objects by inputting the object relationship graph to the image modification GNN model, and
generate a modified image of the first image by applying an image effect to each of the plurality of objects, based on the object information and the image effect data.

2. The electronic device of claim 1, wherein the relationships between the plurality of objects in the object relationship graph comprise an interaction between at least one person among the plurality of objects and at least one thing among the plurality of objects.

3. The electronic device of claim 1, wherein the object relationship graph comprises each of the plurality of objects as a node, and each of the relationships between the plurality of objects as an edge.

4. The electronic device of claim 3, wherein:
the object information comprises respective features of the plurality of objects, and
the object relationship graph comprises each of the features of the plurality of objects as a node feature.

5. The electronic device of claim 3, wherein:
each edge of the object relationship graph has a weight based on a type of a relevant relationship, and
an edge having a plurality of corresponding relationships among the edges has, as a weight, an average of weights based on the plurality of corresponding relationships.

6. The electronic device of claim 1, wherein the image effect data comprises a table that comprises each of the plurality of objects as a row and each of the image effects as a column.

7. The electronic device of claim 1, wherein the processor is further configured to:
display the modified image,
display objects and at least one relationship, which correspond to an image effect applied to the modified image,
receive a selection input by a user, with respect to the displayed objects and the displayed at least one relationship,
generate a final modified image, in which an image effect corresponding to the plurality of objects and the at least one relationship, for which the selection input is received, is applied, and
update the image modification GNN model based on the selection input by the user.

8. The electronic device of claim 1, the processor is further configured to:
generate the object relationship graph based on metadata of the first image.

9. An electronic device comprising:
a processor; and
a memory storing instructions,
wherein, by executing the instructions, the processor is configured to:
receive a first image and a modified image that is a modified version of the first image to which an image effect is applied,
recognize a plurality of objects in the first image to generate object information representing the plurality of objects,
generate an object relationship graph indicating relationships between the plurality of objects, based on the first image and the object information,
generate, based on the first image, the object information, and the modified image, image effect data comprising image effects respectively applied to the plurality of objects in the modified image, and
train, based on the object relationship graph and the image effect data, an image modification Graph Neural Network (GNN) model comprising the object relationship graph as an input and the image effect data as an output.

10. The electronic device of claim 9, wherein the relationships between the plurality of objects in the object relationship graph comprise an interaction between at least one person among the plurality of objects and at least one thing among the plurality of objects.

11. The electronic device of claim 9, wherein the object relationship graph comprises each of the plurality of objects as a node, and each of the relationships between the plurality of objects as an edge.

12. The electronic device of claim 11, wherein:
the object information comprises respective features of the plurality of objects, and
the object relationship graph comprises each of the features of the plurality of objects as a node feature.

13. The electronic device of claim 11, wherein:
each edge of the object relationship graph has a weight based on a type of a relevant relationship, and
an edge having a plurality of corresponding relationships among the edges has, as a weight, an average of weights based on the plurality of corresponding relationships.

14. The electronic device of claim 9, the processor is further configured to:
generate the object relationship graph based on metadata of the first image.

15. The electronic device of claim 9, wherein the image effect data comprises a table which comprises each of the plurality of objects as a row and each of the image effects as a column.

16. A method performed by an electronic device, the method comprising:
receiving a first image;
recognizing a first plurality of objects in the first image and generate first object information representing the first plurality of objects;
generating a first object relationship graph indicating first relationships between the first plurality of objects, based on the first image and the first object information;
outputting, by an image modification Graph Neural Network (GNN) model, first image effect data comprising first image effects to be respectively applied to the first plurality of objects by inputting the first object relationship graph to the image modification GNN model; and
generating a modified image of the first image by applying an image effect to each of the plurality of objects, based on the first object information and the first image effect data.

17. The method of claim 16, further comprising:
receiving the modified image;
recognizing a second plurality of objects in the first image and generate second object information representing the second plurality of objects;
generating a second object relationship graph indicating second relationships between the second plurality of objects, based on the first image and the second object information;
generating, based on the first image, the second object information, and the modified image, second image effect data comprising second image effects respectively applied to the second plurality of objects in the modified image; and
training, based on the second object relationship graph and the second image effect data, the image modification GNN model.

18. A non-transitory computer-readable recording medium having recorded thereon a program for executing the method of claim 17 on a computer.

19. A non-transitory computer-readable recording medium having recorded thereon a program for executing the method of claim 16 on a computer.

* * * * *